(12) United States Patent
Guralp et al.

(10) Patent No.: US 11,999,263 B2
(45) Date of Patent: Jun. 4, 2024

(54) VOLTAGE CONTROL OF MULTI-DRIVE SYSTEMS

(71) Applicant: GM GLOBAL TECHNOLOGY OPERATIONS LLC, Detroit, MI (US)

(72) Inventors: Orgun A. Guralp, Northville, MI (US); Suresh Gopalakrishnan, Troy, MI (US); Chandra S. Namuduri, Troy, MI (US); Chunhao J. Lee, Troy, MI (US); Muhammad Hussain Alvi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/982,775

(22) Filed: Nov. 8, 2022

(65) Prior Publication Data
US 2024/0149746 A1 May 9, 2024

(51) Int. Cl.
*B60L 58/19* (2019.01)
*B60L 50/60* (2019.01)
*B60L 58/21* (2019.01)

(52) U.S. Cl.
CPC .............. *B60L 58/19* (2019.02); *B60L 50/66* (2019.02); *B60L 58/21* (2019.02)

(58) Field of Classification Search
CPC ........... B60L 58/19; B60L 50/66; B60L 58/21
USPC ........................................................ 307/9.1
See application file for complete search history.

(56) References Cited

U.S. PATENT DOCUMENTS

2019/0283611 A1\* 9/2019 Conlon ................... H02J 3/322

\* cited by examiner

*Primary Examiner* — Daniel Cavallari
*Assistant Examiner* — Dru M Parries
(74) *Attorney, Agent, or Firm* — CANTOR COLBURN LLP

(57) ABSTRACT

A system for controlling propulsion in a vehicle includes a switching system connected to a battery system and a propulsion system. The battery system includes a first battery assembly and a second battery assembly, the propulsion system includes a first drive unit and a second drive unit, and the switching system includes a first switching device configured to selectively connect the first drive unit to the battery system and a second switching device configured to selectively connect the second drive unit to the battery system. The first switching device and the second switching device are independently operable. The system also includes a controller configured to operate the switching system to vary a voltage applied to at least one of the first drive unit and the second drive unit during vehicle propulsion.

20 Claims, 10 Drawing Sheets

VOLTAGE CONTROL OF MULTI-DRIVE SYSTEMS

INTRODUCTION

The subject disclosure relates to vehicles, and more specifically, to controlling voltage to an electric drive or drives of a vehicle.

Vehicles, including gasoline and diesel power vehicles, as well as electric and hybrid electric vehicles, feature battery storage for purposes such as powering electric motors, electronics and other vehicle subsystems. Some vehicles feature multi-drive systems that include two or more electric motors for applying torque. For example, some vehicles include a drive system for controlling torque applied to rear wheels, and another drive system for controlling torque to front wheels.

SUMMARY

In one exemplary embodiment, a system for controlling propulsion in a vehicle includes a switching system connected to a battery system and a propulsion system. The battery system includes a first battery assembly and a second battery assembly, the propulsion system includes a first drive unit and a second drive unit, and the switching system includes a first switching device configured to selectively connect the first drive unit to the battery system and a second switching device configured to selectively connect the second drive unit to the battery system. The first switching device and the second switching device are independently operable. The system also includes a controller configured to operate the switching system to vary a voltage applied to at least one of the first drive unit and the second drive unit during vehicle propulsion.

In addition to one or more of the features described herein, the first switching device and the second switching device include mechanical switches or solid state switches.

In addition to one or more of the features described herein, the first switching device includes a first switch and a second switch connected in parallel to the first drive unit, and the second switching device includes a third switch and a fourth switch connected in parallel to the second drive unit.

In addition to one or more of the features described herein, the switching system includes a battery switching device configured to selectively connect the first battery assembly to the second battery assembly in series.

In addition to one or more of the features described herein, the controller is configured to put the propulsion system into a low voltage state by opening the battery switching device, operating the first switching device to supply a low voltage to the first drive unit, and operating the second switching device to supply the low voltage to the second drive unit.

In addition to one or more of the features described herein, the controller is configured to put the propulsion system into a high voltage state by closing the battery switching device, operating the first switching device to supply a high voltage to the first drive unit, and operating the second switching device to supply the high voltage to the second drive unit.

In addition to one or more of the features described herein, the controller is configured to put the propulsion system into an intermediate state by closing the battery switching device, operating one of the first switching device and the second switching device to supply a low voltage to one of the first drive unit and the second drive unit, and operating another of the first switching device and the second switching device to supply a high voltage to another of the first drive unit and the second drive unit.

In addition to one or more of the features described herein, the controller is configured to vary the voltage by sequentially operating the first switching device and the second switching so that a drive torque is applied to the vehicle by one of the first switching device and the second switching device during operation of another of the first switching device and the second switching device to vary the voltage.

In one exemplary embodiment, a method of controlling propulsion of a vehicle includes receiving a request to enter an operating mode of the vehicle, the vehicle including a switching system connected to a battery system and a propulsion system. The battery system includes a first battery assembly and a second battery assembly, the propulsion system includes a first drive unit and a second drive unit, and the switching system includes a first switching device configured to selectively connect the first drive unit to the battery system and a second switching device configured to selectively connect the second drive unit to the battery system. The first switching device and the second switching device are independently operable. The method also includes, based on the request, operating the switching system by a controller to vary a voltage applied to at least one of the first drive unit and the second drive unit during vehicle propulsion.

In addition to one or more of the features described herein, the first switching device includes a first switch and a second switch connected in parallel to the first drive unit, and the second switching device includes a third switch and a fourth switch connected in parallel to the second drive unit.

In addition to one or more of the features described herein, the switching system includes a battery switching device configured to selectively connect the first battery assembly to the second battery assembly in series.

In addition to one or more of the features described herein, operating the switching system includes putting the propulsion system into a low voltage state by opening the battery switching device, operating the first switching device to supply a low voltage to the first drive unit, and operating the second switching device to supply the low voltage to the second drive unit.

In addition to one or more of the features described herein, operating the switching system includes putting the propulsion system into a high voltage state by closing the battery switching device, operating the first switching device to supply a high voltage to the first drive unit, and operating the second switching device to supply the high voltage to the second drive unit.

In addition to one or more of the features described herein, operating the switching system includes putting the propulsion system into an intermediate state by closing the battery switching device, operating one of the first switching device and the second switching device to supply a low voltage to one of the first drive unit and the second drive unit, and operating another of the first switching device and the second switching device to supply a high voltage to another of the first drive unit and the second drive unit.

In addition to one or more of the features described herein, the controller is configured to vary the voltage by sequentially operating the first switching device and the second switching so that a drive torque is applied to the vehicle by one of the first switching device and the second switching device during operation of another of the first switching device and the second switching device to vary the voltage.

In one exemplary embodiment, a vehicle system includes a memory having computer readable instructions and a processing device for executing the computer readable instructions, the computer readable instructions controlling the processing device to perform a method. The method includes receiving a request to enter an operating mode of the vehicle, the vehicle including a switching system connected to a battery system and a propulsion system. The battery system includes a first battery assembly and a second battery assembly, the propulsion system includes a first drive unit and a second drive unit, and the switching system includes a first switching device configured to selectively connect the first drive unit to the battery system and a second switching device configured to selectively connect the second drive unit to the battery system. The first switching device and the second switching device are independently operable. The method also includes, based on the request, operating the switching system by a controller to vary a voltage applied to at least one of the first drive unit and the second drive unit during vehicle propulsion.

In addition to one or more of the features described herein, the first switching device includes a first switch and a second switch connected in parallel to the first drive unit, the second switching device includes a third switch and a fourth switch connected in parallel to the second drive unit, and the switching system includes a battery switching device configured to selectively connect the first battery assembly to the second battery assembly in series.

In addition to one or more of the features described herein, operating the switching system includes putting the propulsion system into a low voltage state by opening the battery switching device, operating the first switching device to supply a low voltage to the first drive unit, and operating the second switching device to supply the low voltage to the second drive unit.

In addition to one or more of the features described herein, operating the switching system includes putting the propulsion system into a high voltage state by closing the battery switching device, operating the first switching device to supply a high voltage to the first drive unit, and operating the second switching device to supply the high voltage to the second drive unit.

In addition to one or more of the features described herein, operating the switching system includes putting the propulsion system into an intermediate state by closing the battery switching device, operating one of the first switching device and the second switching device to supply a low voltage to one of the first drive unit and the second drive unit, and operating another of the first switching device and the second switching device to supply a high voltage to another of the first drive unit and the second drive unit.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
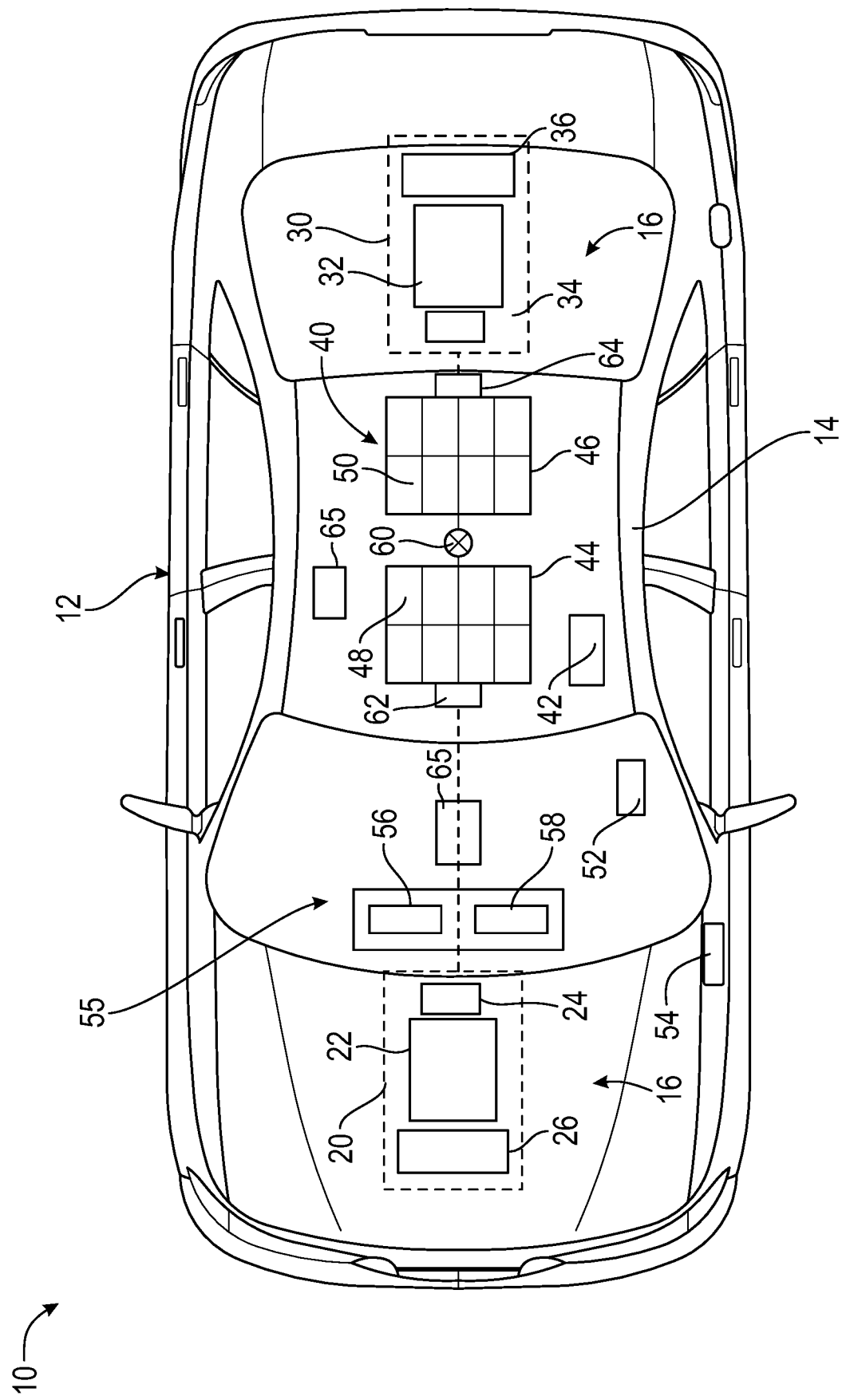
FIG. 1 is a top view of a motor vehicle including a multi-drive propulsion system and a switching system for controlling voltage, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for controlling propulsion of a vehicle. In an embodiment, the vehicle includes a multi-drive system having at least a first drive system or drive unit and a second drive system or drive unit. The vehicle also includes a battery system having at least a first battery assembly and a second battery assembly. For example, the first battery assembly may be a first battery pack and the second battery assembly may be a second battery pack. In another example, if the battery system includes a single battery pack (e.g., a single pack with two halves), the first and second battery assemblies may each be a part of the battery pack (e.g., one of the two halves).

The propulsion system includes a switching system having independently controllable switching devices that can be operated to vary a voltage level applied to the first and/or second drive unit. The switching devices may be controlled during vehicle propulsion, for example, to transition the vehicle between various operating states. In an embodiment, the operating states include an operating state in which both drive units receive a low voltage (e.g., by powering the first drive unit with the first battery pack or battery assembly and powering the second drive unit with the second battery pack or battery assembly), an operating state in which both drive units receive a high voltage (e.g., by powering the first drive unit and the second drive unit with both battery packs or battery assemblies), and/or an operating state in which one drive unit receives a low voltage and another drive unit receives a high voltage. The switching devices may be controlled in a sequential manner to avoid zero torque conditions during transitions, to ensure smooth transitions and drivability.

It is noted that "low voltage" and "high voltage" are relative terms and are not intended to restrict voltage levels to specific values or ranges. For example, embodiments are described herein in conjunction with a low voltage of 400 V and a high voltage of 800 V; however, low and high voltages may be any desired or suitable voltage levels or ranges.

Embodiments described herein present numerous advantages and technical effects. For example, current multi-drive systems, such as dual drive systems, are not capable of providing different levels of direct current (DC) voltage simultaneously to different drive units during driving or propulsion. Instead, current systems require that a vehicle be in a no-drive or no load condition (i.e., zero torque applied to the drive units) when transitioning between operating modes. In addition, current systems require that both drives operate at the same voltage (e.g., 400 V for system efficiency and 800 V for enhanced performance). Embodiments described herein provide a solution to these limitations by allowing multi-drive systems to be operated during driving to change the DC voltage applied to different electric drive units and allow drive units to be operated concurrently at different voltages.

The embodiments are not limited to use with any specific vehicle and may be applicable to various contexts. For example, embodiments may be used with automobiles, trucks, aircraft, construction equipment, farm equipment, automated factory equipment and/or any other device or system that includes multiple drives and/or multiple conversion devices.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle. In an embodiment, the vehicle 10 is an electric vehicle that includes multiple motors and/or drive systems. For example, the propulsion system 16 is a multi-drive system that includes a first drive unit 20 and a second drive unit 30. The first drive unit 20 includes a first electric motor 22 and a first inverter 24, as well as other components such as a cooling system 26. The second drive unit 30 includes a second electric motor 32 and a second inverter 34, and other components such as a cooling system 36. The inverters 24 and 34 (e.g., traction power inverter units or TPIMs) each convert DC power from a high voltage (HV) battery system 40 to poly-phase (e.g., two-phase, three-phase, six-phase, etc.) alternating current (AC) power to drive the motors 22 and 32.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the first electric motor 22 drives front wheels (not shown) and the second electric motor 32 drives rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the drive unit 20 and the drive unit 30 are electrically connected to the battery system 40. The battery system 40 may also be electrically connected to other components, such as vehicle electronics (e.g., via an auxiliary power module or APM 42). The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the inverter 24, and a second battery pack 46 connected to the inverter 34. The battery pack 44 includes a plurality of battery modules 48, and the battery pack 46 includes a plurality of battery modules 50. Each module 48, 50 includes a number of individual cells (not shown).

The battery system 40 and/or the propulsion system 16 includes various switching devices for controlling operation of the battery packs and selectively connecting the battery packs to the drive systems 20 and 30. The switching devices may also be operated to selectively connect the battery pack 44 and the battery pack 46 to a charging system. The charging system can be used to charge the battery pack 44 and the battery pack 46, and/or to supply power from the battery pack 44 and/or the battery pack 46 to charge another energy storage system (e.g., vehicle-to-vehicle (V2V) and/or vehicle-to-everything (V2X) charging). The charging system includes an onboard charging module (OBCM) 52 that is electrically connected to a charge port 54 for charging from an energy storage system such as a utility AC power supply.

In an embodiment, the switching system includes at least one switching device 60 (also referred to as a "battery switching device") for selectively connecting the battery pack 44 to the battery pack 46 in series. A switching device 62 selectively connects to the battery pack 44 to the inverter 24, and a switching device 64 selectively connects the battery pack 46 to the inverter 34.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

FIGS. 2-8 depict embodiments of the switching system, including the switching devices 60, 62 and 64. The embodiments are discussed in conjunction with the vehicle 10 and the dual drive system thereof. Embodiments are not so limited, as they can be used with any suitable vehicle system having multiple (i.e., two or more) drive units and battery packs.

As shown, the first inverter 24 and the second inverter 34 are connected to a propulsion DC bus 66. Each of the first motor 22 and the second motor 32 is a three-phase motor having three phase motor windings. However, embodiments described herein are not so limited. For example, the first and second motors 22 and 32 may be any poly-phase machines supplied by poly-phase inverters, and the drive units can be realized using a single machine having independent sets of windings.

In an embodiment, the switching system is controllable to supply varying voltages to the inverter 24 and/or the inverter 34. In an embodiment, the switching system is controllable to apply a first voltage ("low voltage") to the motor(s), or apply a second voltage ("high voltage"), as discussed further herein. For example, the switching system can be controlled to apply a 400V nominal or average voltage or an 800V nominal or average voltage. It is noted that there may be more than two battery packs, with at least one switch between adjacent battery packs; in this case, the batteries can be connected to each other in various ways to provide more than two voltages. In addition, there may be a single battery pack having multiple parts (e.g., a single battery with switches separating parallel strings of cell); in this case, the switching system can be used to apply different voltages by connecting the strings in various ways.

In the embodiments of FIGS. 2-8, each inverter 24 and 34 has three phase branches (A, B and C) for connecting to respective phase terminals in the motor 22 and the motor 32, respectively. The inverter 24 includes three sets of switches 24a, 24b and 24c in half-bridge configurations for converting DC power to AC power to drive the motor 22. Likewise, the inverter 34 includes three sets of switches 34a, 34b and 34c in half-bridge configurations for converting DC power to AC power to drive the motor 32.

The battery switching device 60 includes at least one switch that can be operated to connect and disconnect the battery packs to each other. The battery switching device 60 may include two switches 70 (SE1) and 72 (SE2) as shown, or may include a single switch. The battery pack 44 is connected to the propulsion bus 66 by switches 74 (SA1) and 76 (SA2), and the battery pack 46 is connected to the propulsion bus 66 by switches 78 (SB1) and 80 (SB2).

The switches may be operated in various configurations to control which battery pack(s) supplies which inverter(s), and to vary the voltage applied to the inverter(s). In an embodiment, the battery packs 44 and 46 both have the same nominal voltage (e.g., 400 V), and the switches can be controlled to connect the battery packs 44 and 46 in parallel to supply the low voltage (voltage is the same as the battery pack voltages, and total current is sum of currents through the battery packs 44 and 46), and can be controlled to connect the battery packs in series to supply the high voltage (voltage is the sum of individual voltages of the battery packs 44 and 46).

The switching device 62 ("first switching device") and the switching device 64 ("second switching device") may be single pole double throw switches (or other types of switches) and are operable to selectively connect the inverters and drive units to the propulsion bus 66. The switching devices 62 and 64 provide flexibility in applying voltage levels to the motors 22 and 32, and allow each motor 22 and 32 to be operated at different bus voltage levels. The switching devices 62 and 64 can be operated during drive conditions, and controlled to change voltage levels without any interruption, thereby avoiding torque holes (zero voltage during switching) and ensuring smooth transitions and drivability.

The switching device 62 is configured as a three-way switching device that connects the first inverter 24 to two switches or switch legs. The switching device 62 is shown schematically as being connected to the inverter 24 via a node C1. The switching device 62 includes a first switch (or first switch leg) denoted as switch 62a (A1). A second switch (or second switch leg) denoted as switch 62b (B1) is connected to the node C1 and is parallel to the switch 62a. Because the switch 62a and the switch 62b are both connected to the node C1 at one side, but are connected to different points in the circuit across the switch 76 (SA2), the switching device 62 can be considered a single device known as a single pole double throw switch. The switching state of the switches 62a and 62b may depend on whether the switch 76 (SA2) is open or closed.

The switching device 64 is configured as a three-way switching device that connects the second inverter to two switches or switch legs. The switching device 64 is shown schematically as being connected to the inverter 34 via a node C2. The switching device 64 includes a third switch (or third switch leg) denoted as switch 64a (A2). A fourth switch (or fourth switch leg) denoted as switch 64b (B2) is connected to the node C2 and is parallel to the switch 64a. Because both the switch 64a and the switch 64b are both connected to the node C2 at one side, but are connected to different points in the circuit across the switch 78 (SB1), the switching device 64 can be considered a single pole double throw switch.

Figure 2:
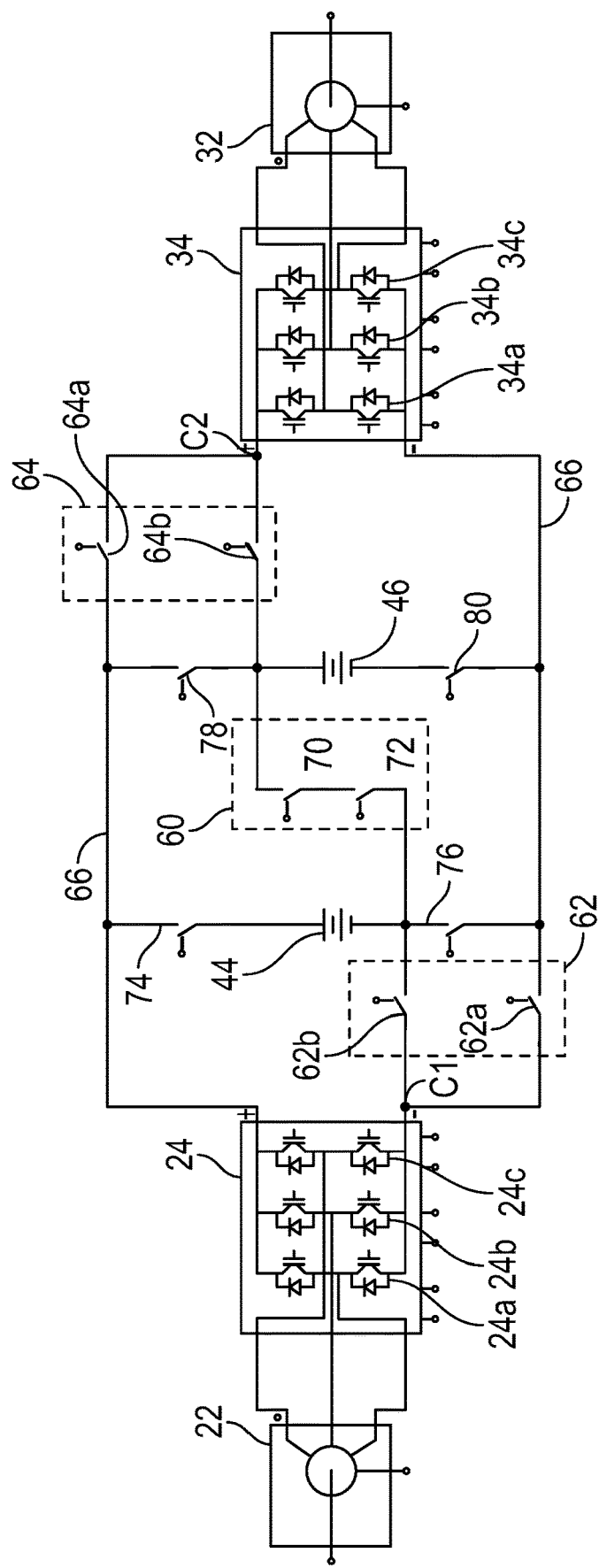
FIG. 2 depicts a propulsion system that includes a first drive unit and a second drive unit, a battery system having two separate battery packs or two halves of a single pack, and a switching system including independently operable mechanical switching devices for applying variable voltage to the first and/or second drive unit, in accordance with an exemplary embodiment.

FIG. 2 depicts an embodiment in which the switching devices 62 and 64 include mechanical contactors. The switching devices 62 and 64 are configured as single pole double throw (SPDT) switches for illustration purposes, but can be any other suitable type of mechanical switch. Each switching device 62 and 64 may be integrated into the battery system circuit, or included as a single device or removable module.

Figure 3:
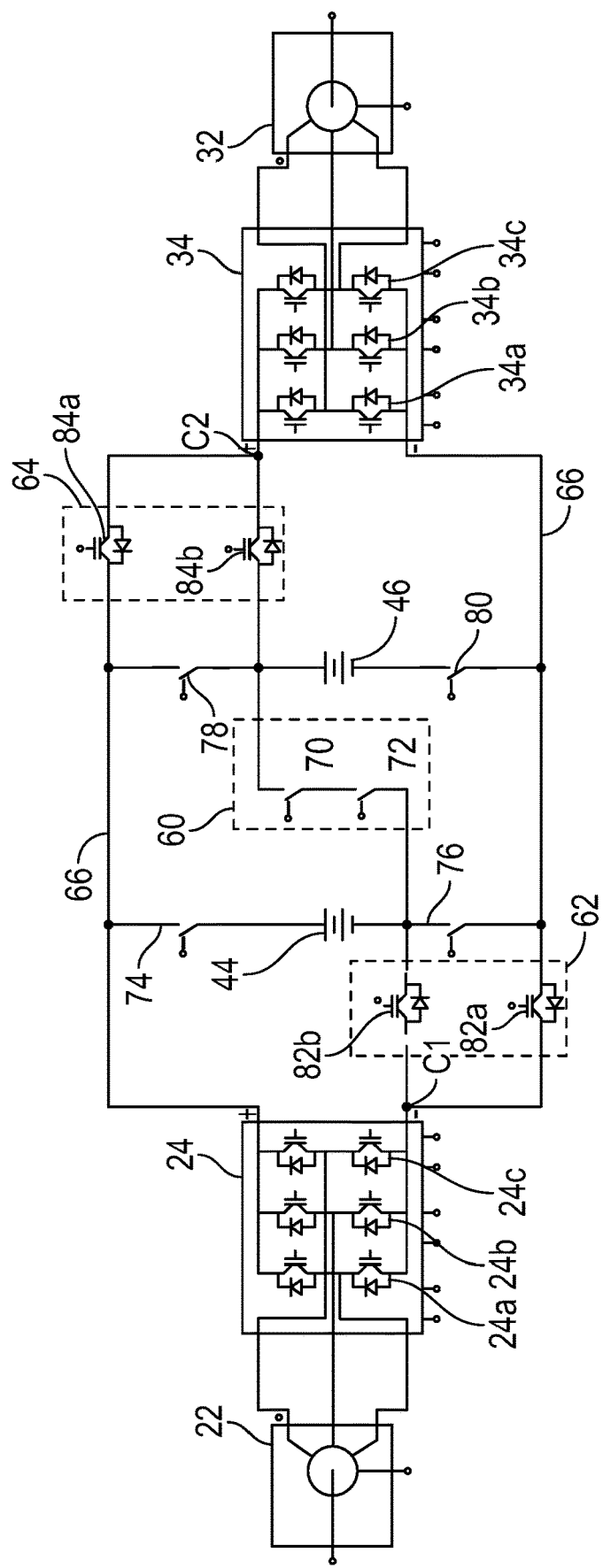
FIG. 3 depicts a propulsion system that includes a first drive unit and a second drive unit, a battery system having two separate battery packs, or two halves of a single pack, and a switching system including independently operable solid state switching devices for applying variable voltage to the first and/or second drive unit, in accordance with an exemplary embodiment.

FIG. 3 depicts an embodiment in which the switching devices 62 and 64 are configured as solid state switching devices. Any suitable solid state or electronic device may be employed as a switch. For example, the switching devices 62 and 64 can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (Sic) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

For example, the switching device 62 includes two solid state switches such as IGBTs 82a and 82b, which are connected to the node C1 as a half-bridge. The switching device 64 includes IGBTs 84a and 84b (or two other solid state switches). In this example, the IGBT 82a is the first switch, the IGBT 82b is the second switch, the IGBT 84a is the third switch, and the IGBT 84b is the fourth switch.

In an embodiment, the IGBTs 82a (A1) and 84b (B2) operate at the low voltage (e.g., 400 V), and the IGBT 82b (B1) operates at either the low voltage or the high voltage (e.g., 800 V).

Figure 4:
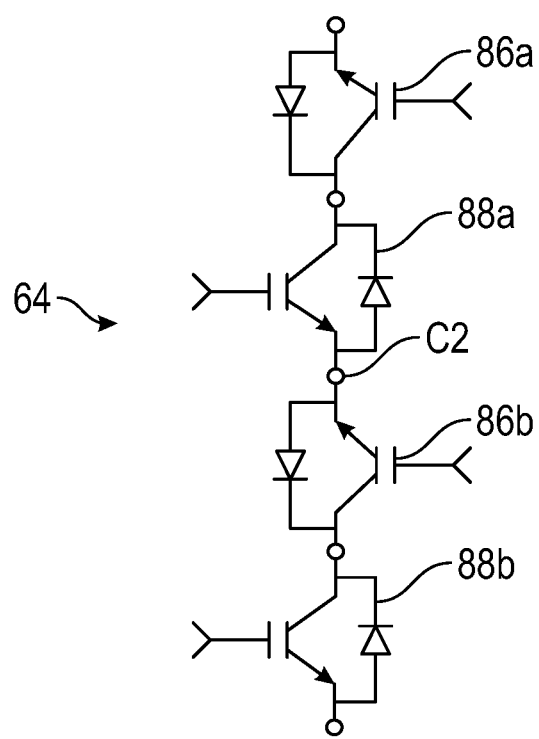
FIG. 4 depicts an embodiment of a solid state switching device.

Alternatively, each half bridge is formed by a four-quadrant bi-directional current and voltage. For example, as shown in FIG. 4, the IGBT 84a (A2) is formed by two solid state switches 86a and 88a (e.g., IGBTs) having opposing polarities. The IGBT 84b (B2) is formed by two solid state switches 86b and 88b (e.g., IGBTs) having opposing polarities.

FIGS. 5-8 depict various operating states or switching states of the propulsion system 16 and the switching system. Control of the switching devices 62 and 64 and switching states are discussed in conjunction with the embodiment of FIG. 2 (mechanical contactors). However, the switching states can be similarly controlled using solid state switches such as the half-bridge switches of FIG. 3.

Figure 5:
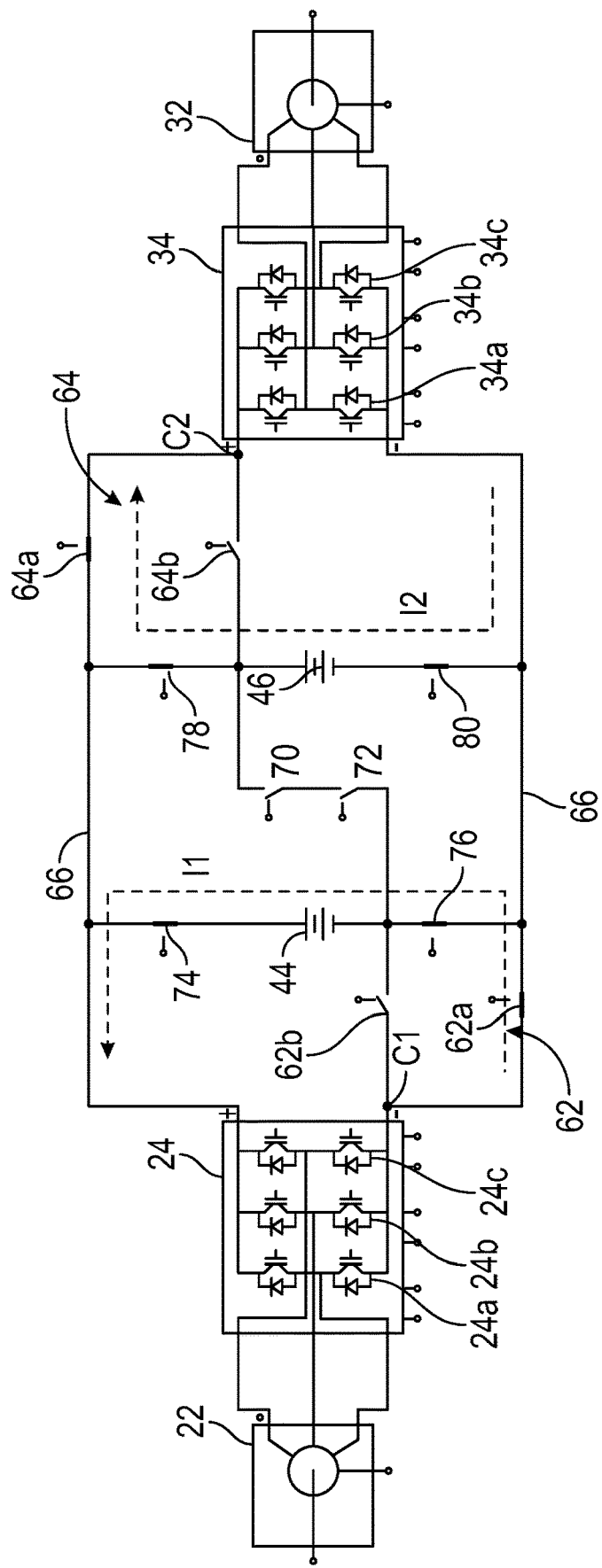
FIG. 5 depicts the propulsion system of FIG. 2 in a low voltage operating state, in accordance with an exemplary embodiment.

FIG. 5 shows the switching system when the vehicle 10 is in a "low voltage" operating mode. In this mode, the switches 70 (SE1) and 72 (SE2) are open (turned OFF), and the battery packs 44 and 46 are connected in parallel to the bus 66. The battery pack 44 supplies power to the inverter 24 using the battery voltage (low voltage, such as 400 V), and the battery pack 46 separately supplies power to the inverter at the low voltage.

The switching device 62 connects the node C1 to the battery pack 44 by opening (turning OFF) the switch 62b (B1) and closing the switch 62a (A1). Switches 74 (SA1) and 76 (SA2) are closed (turned ON). Switches 78 (SB1) and 80 (SB2) are closed. Switch 64a is closed and switch 64b is open to connect the inverter 34 to the battery pack 46 via the node C2. During operation, the battery pack 44 supplies current I1 to the inverter 24 at the low voltage, and the battery pack 46 supplies current I2 to the inverter 34 at the low voltage.

Figure 6:
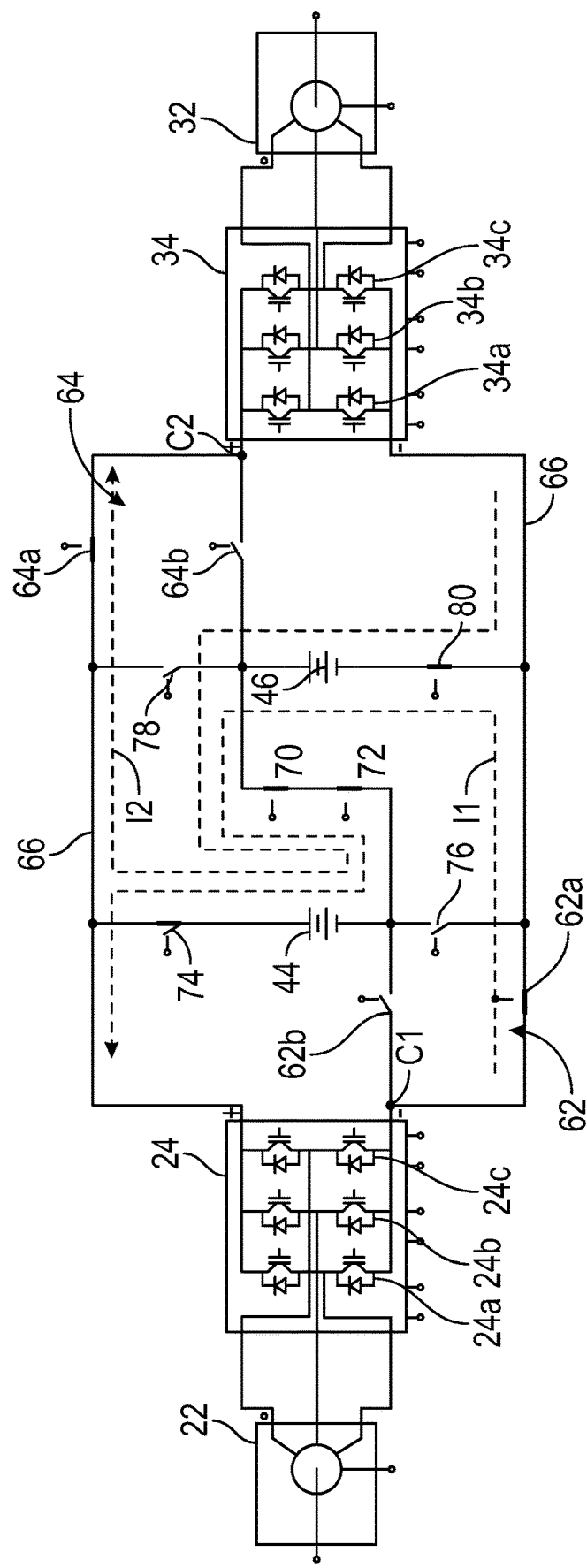
FIG. 6 depicts the propulsion system of FIG. 2 in a high voltage operating state, in accordance with an exemplary embodiment.

FIG. 6 shows the switching system when the vehicle 10 is in a "high voltage" operating mode. In this mode, the switches 70 (SE1) and 72 (SE2) are closed to connect the battery packs 44 and 46 in series. The battery packs 44 and 46 both supply power to the inverter 24 and the inverter 34 at a high voltage (the sum of the battery voltages, such as 800 V).

The switching device 62 connects the node C1 to the battery packs 44 and 46 by opening the switch 62b (B1) and closing the switch 62a (A1). Switch 74 (SA1) is closed and switch 76 (SA2) is open. Switch 78 (SB1) is open and switch 80 (SB2) is closed. Switch 64a is closed and switch 64b is open to connect the inverter 34 to the battery packs 44 and 46 via the node C2. During operation, current I1 is supplied to the inverter 24 at the high voltage, and current I2 is supplied to the inverter 34 at the high voltage.

Figure 7:
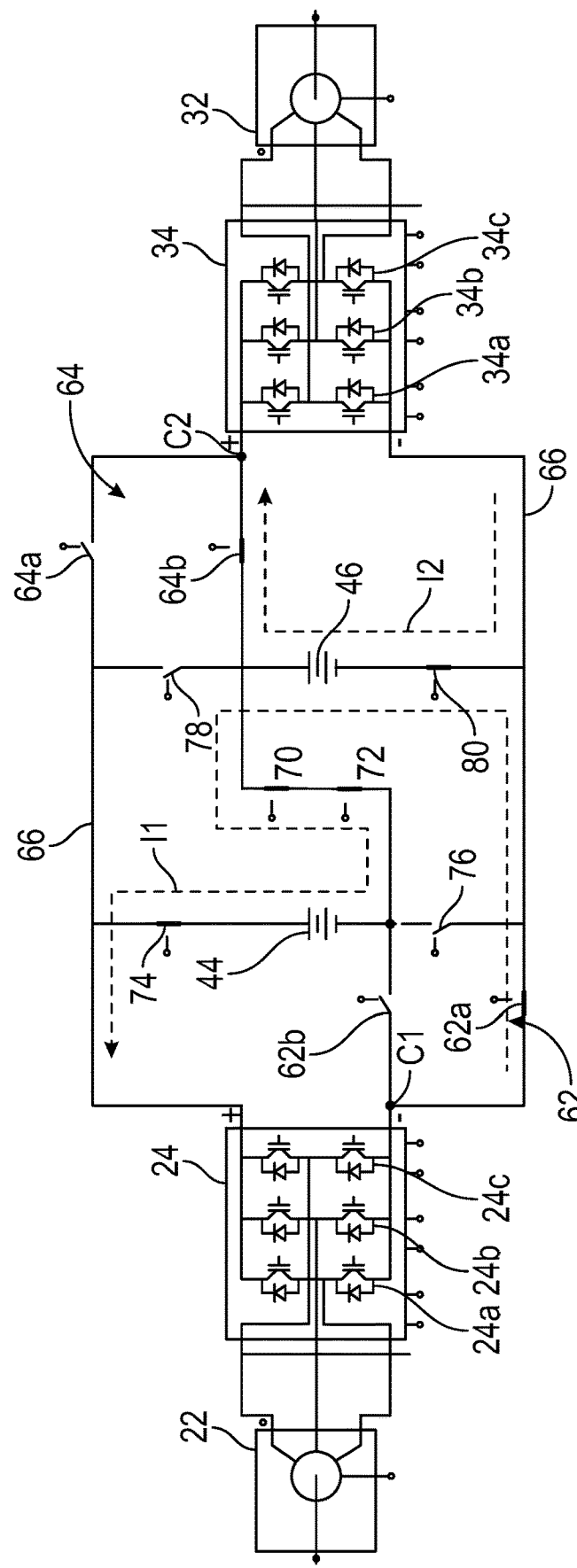
FIG. 7 depicts the propulsion system of FIG. 2 in an intermediate operating state in which the first drive unit is powered at a high voltage and the second drive unit is powered at a low voltage, in accordance with an exemplary embodiment.

FIG. 7 shows the switching system when the vehicle 10 and the propulsion system 16 is in an "intermediate" operating mode. In this mode, the inverter 24 is supplied with power at the high voltage (e.g., 800 V), and the inverter 34 is supplied with power at the low voltage (e.g., 400 V). The switches 70 (SE1) and 72 (SE2) are closed to connect the battery packs 44 and 46 in series.

The switching device 62 connects the node C1 to the battery packs 44 and 46 by opening the switch 62b (B1) and closing the switch 62a (A1). Switch 74 (SA1) is closed and switch 76 (SA2) is open. Switch 78 (SB1) is open and switch 80 (SB2) is closed. Switch 64a (A2) is open and switch 64b (B2) is closed to connect the inverter 34 only to the battery pack 46. During operation, current I1 is supplied to the inverter 24 at the high voltage, and current I2 is supplied to the inverter 34 at the low voltage.

Figure 8:
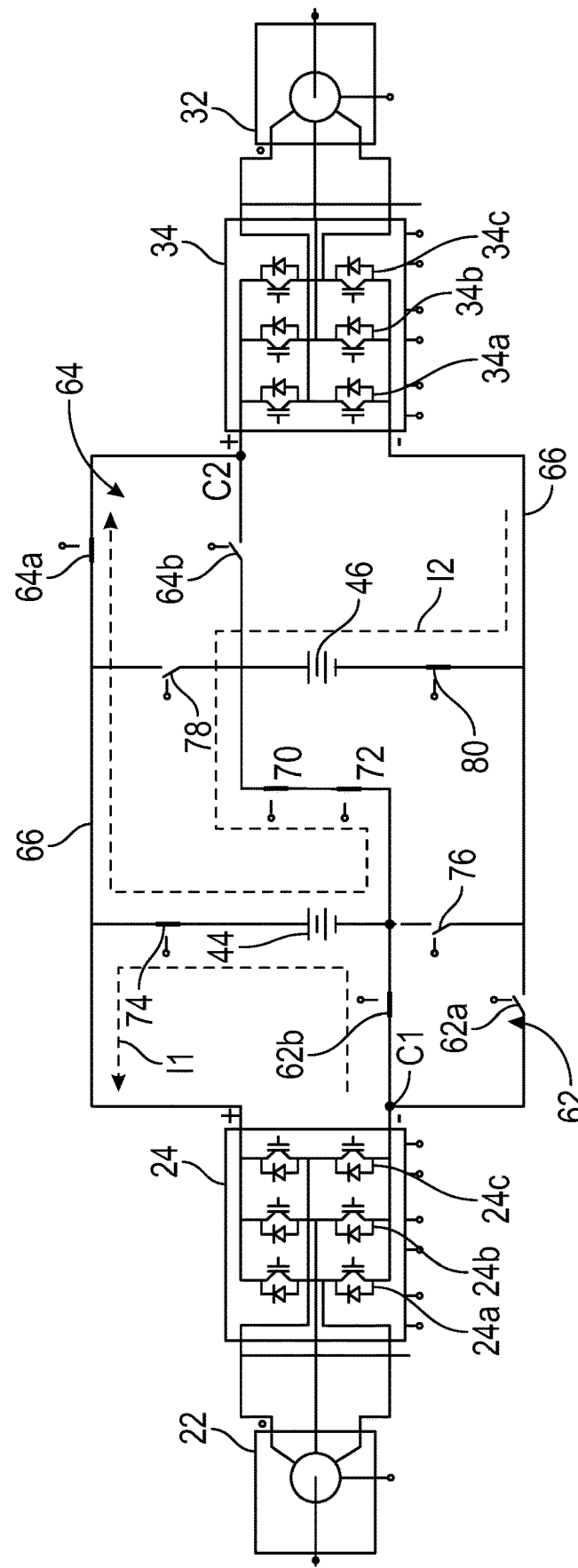
FIG. 8 depicts the propulsion system of FIG. 2 in an intermediate operating state in which the first drive unit is powered at a low voltage and the second drive unit is powered at a high voltage, in accordance with an exemplary embodiment.

FIG. 8 shows the switching system when the vehicle 10 is in an intermediate operating mode, in which the inverter 24 is supplied with power at the low voltage, and the inverter 34 is supplied with power at the high voltage. The switches 70 (SE1) and 72 (SE2) are closed to connect the battery packs 44 and 46 in series.

The switching device 62 connects the node C1 only to the battery pack 44 by closing the switch 62b (B1) and opening the switch 62a (A1). Switch 74 (SA1) is closed and switch 76 (SA2) is open. Switch 78 (SB1) is open and switch 80 (SB2) is closed. Switch 64a (A2) is closed and switch 64b (B2) is open to connect the inverter 34 to the battery packs 44 and 46. During operation, current I1 is supplied to the inverter 24 at the low voltage, and current I2 is supplied to the inverter 34 at the high voltage.

Figure 9:
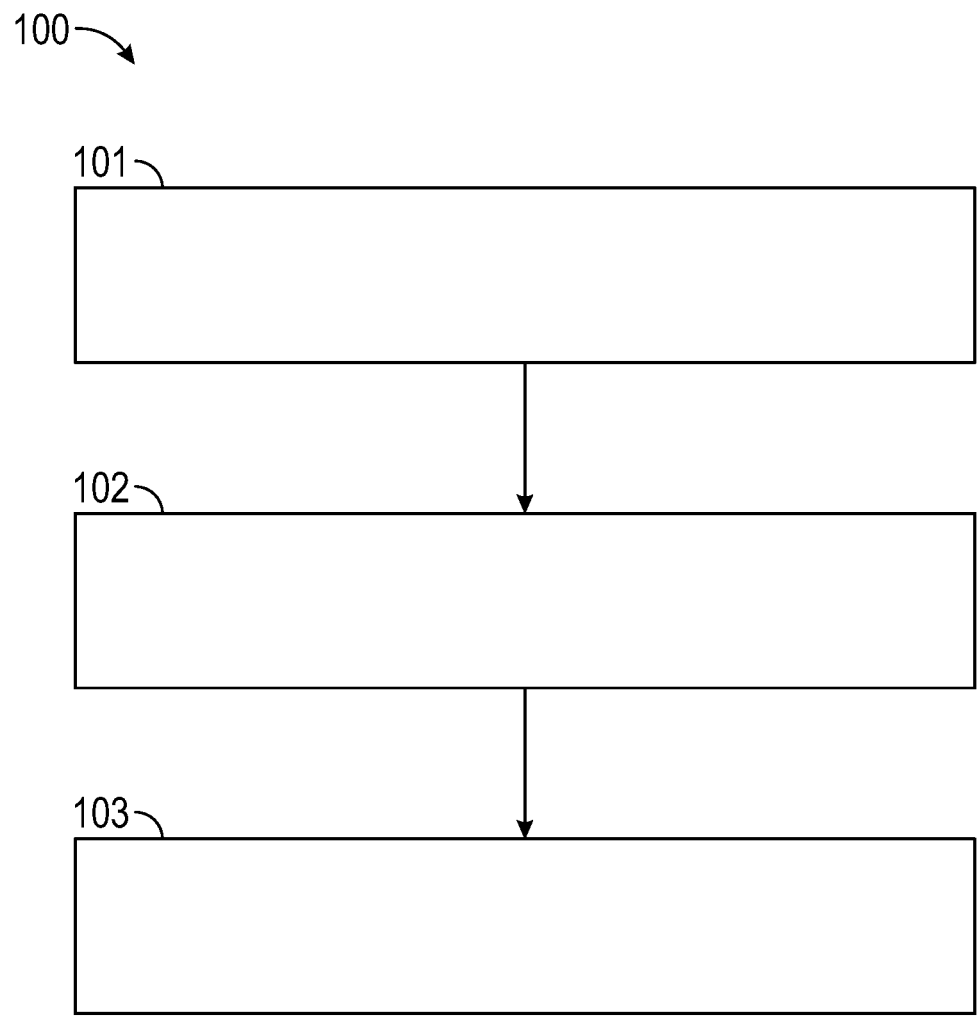
FIG. 9 is a flow diagram depicting aspects of a method of controlling propulsion of a vehicle, in accordance with an exemplary embodiment.

FIG. 9 illustrates embodiments of a method 100 of controlling a propulsion system of a vehicle, such as the propulsion system 16. Aspects of the method 100 may be performed by a processor or processors disposed in a vehicle, such as the controller 65. However, the method 100 is not so limited, as the method may be performed by any suitable processing device or system, or combination of processing devices.

The method 100 includes a number of steps or stages represented by blocks 101-103. The method 100 is not limited to the number or order of steps therein, as some steps represented by blocks 101-103 may be performed in a different order than that described below, or fewer than all of the steps may be performed.

At block 101, during a driving or propulsion condition (i.e., a condition in which voltage is being applied to one or more motors or drive units), the controller 65 determines if it is desired to change an operating mode of the vehicle 10. The determination may be based on receiving a request (e.g., via user interaction with the vehicle 10, such as a request to put the vehicle into a high performance mode). In addition, or alternatively, the determination may be based on measurements of vehicle and/or driver condition, such as vehicle speed, driver interaction with a gas pedal and others.

For example, the vehicle 10 is in a normal mode, in which the switching devices 60 and 62 are set to switching positions such that both drive units 20 and 30 are supplied at a low voltage (e.g., 400 V). The user may request transition into a high performance mode, where high voltage (e.g., 800 V) is to be applied to both drive units. The user may request transition into other modes, such as a mode in which high voltage is applied to one drive unit and low voltage is applied to the other drive unit.

At block 102, the vehicle 10 is transitioned to the requested operating mode by controlling the switching system to put the switching devices in appropriate positions as discussed herein.

In an embodiment, when transitioning to a high voltage or high performance mode, the switching system is operated sequentially so that one drive unit produces torque for propulsion (torque filling) while the other drive unit transitions to this mode. For example, when switching from low to high voltage, the switches 62b and 62a are operated as needed to transition while the battery pack 46 supplies power to the drive unit 30, and subsequently the switches 64a and 64b are operated to complete the transition. The switching devices 62 and 64 can be operated in reverse order when switching from high to low voltage. In this way, the vehicle 10 can transition between modes without entering a zero torque state on the vehicle level, thereby providing a smooth transition.

For example, when transitioning to the intermediate mode in which the front drive unit receives 800 V and the rear drive unit receives 400 V, the front drive unit 20 accepts the full torque demand of the vehicle 10 while the rear drive unit 30 transitions to 400 V. Conversely, when transitioning to the intermediate mode in which the front drive unit receives 400 V and the rear drive unit receives 800 V, the rear drive unit accepts the full torque demand of the vehicle 10 while the front drive unit transitions to 400 V.

At block 103, vehicle propulsion is controlled at the requested operating mode.

Figure 10:
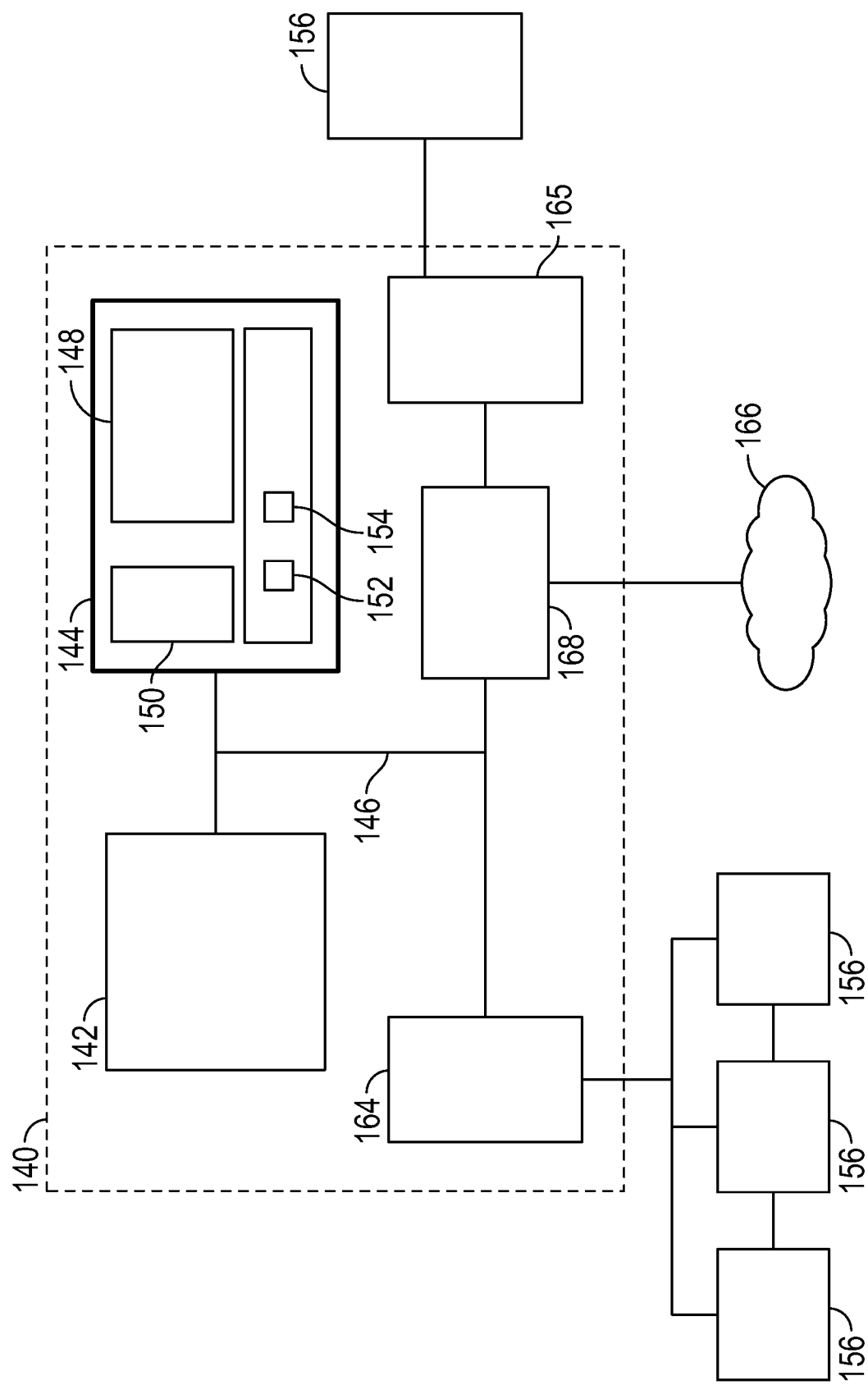
FIG. 10 depicts a computer system in accordance with an exemplary embodiment.

FIG. 10 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to switching between operating modes. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for controlling propulsion in a vehicle, comprising:
   a switching system connected to a battery system and a propulsion system, the battery system including a first battery assembly and a second battery assembly, the propulsion system including a first drive unit and a second drive unit, the switching system including a first switching device configured to selectively connect the first drive unit to the battery system and a second switching device configured to selectively connect the second drive unit to the battery system, the first switching device and the second switching device being independently operable, wherein the first switching device includes a first switch and a second switch connected in parallel to the first drive unit, the second switching device includes a third switch and a fourth switch connected in parallel to the second drive unit, and the switching system includes a battery switching device configured to selectively connect the first battery assembly to the second battery assembly in series; and
   a controller configured to operate the switching system to vary a voltage applied to at least one of the first drive unit and the second drive unit during vehicle propulsion, the controller configured to control the switching system to put the propulsion system into an intermediate voltage state by closing the battery switching device, operating one of the first switching device and the second switching device to supply a low voltage to one of the first drive unit and the second drive unit, and operating another of the first switching device and the second switching device to supply a high voltage to another of the first drive unit and the second drive unit.

2. The system of claim 1, wherein the first switching device and the second switching device include mechanical switches or solid state switches.

3. The system of claim 1, wherein the first switching device and the second switching device are operated sequentially to avoid a zero torque condition.

4. The system of claim 1, wherein the first drive unit is configured to drive front wheels of the vehicle, and the second drive unit is configured to drive rear wheels of the vehicle.

5. The system of claim 1, wherein the controller is configured to put the propulsion system into a low voltage state by opening the battery switching device, operating the first switching device to supply a low voltage to the first drive unit, and operating the second switching device to supply the low voltage to the second drive unit.

6. The system of claim 1, wherein the controller is configured to put the propulsion system into a high voltage state by closing the battery switching device, operating the first switching device to supply a high voltage to the first drive unit, and operating the second switching device to supply the high voltage to the second drive unit.

7. The system of claim 1, wherein the first switching device and the second switching device are configured as single pole double throw switches.

8. The system of claim 1, wherein the controller is configured to vary the voltage by sequentially operating the first switching device and the second switching so that a drive torque is applied to the vehicle by one of the first switching device and the second switching device during operation of another of the first switching device and the second switching device to vary the voltage.

9. A method of controlling propulsion of a vehicle, comprising:
receiving a request to enter an operating mode of the vehicle, the vehicle including a switching system connected to a battery system and a propulsion system, the battery system including a first battery assembly and a second battery assembly, the propulsion system including a first drive unit and a second drive unit, the switching system including a first switching device configured to selectively connect the first drive unit to the battery system and a second switching device configured to selectively connect the second drive unit to the battery system, the first switching device and the second switching device being independently operable, wherein the first switching device includes a first switch and a second switch connected in parallel to the first drive unit, the second switching device includes a third switch and a fourth switch connected in parallel to the second drive unit, and the switching system includes a battery switching device configured to selectively connect the first battery assembly to the second battery assembly in series; and
based on the request, operating the switching system by a controller to vary a voltage applied to at least one of the first drive unit and the second drive unit during vehicle propulsion, wherein operating the switching system includes controlling the switching system to put the propulsion system into an intermediate voltage state by closing the battery switching device, operating one of the first switching device and the second switching device to supply a low voltage to one of the first drive unit and the second drive unit, and operating another of the first switching device and the second switching device to supply a high voltage to another of the first drive unit and the second drive unit.

10. The method of claim 9, wherein the first switching device and the second switching device are operated sequentially to avoid a zero torque condition.

11. The method of claim 9, wherein the first drive unit is configured to drive front wheels of the vehicle, and the second drive unit is configured to drive rear wheels of the vehicle.

12. The method of claim 9, wherein operating the switching system includes putting the propulsion system into a low voltage state by opening the battery switching device, operating the first switching device to supply a low voltage to the first drive unit, and operating the second switching device to supply the low voltage to the second drive unit.

13. The method of claim 9, wherein operating the switching system includes putting the propulsion system into a high voltage state by closing the battery switching device, operating the first switching device to supply a high voltage to the first drive unit, and operating the second switching device to supply the high voltage to the second drive unit.

14. The method of claim 11, wherein the first switching device and the second switching device are configured as single pole double throw switches.

15. The method of claim 11, wherein the controller is configured to vary the voltage by sequentially operating the first switching device and the second switching so that a drive torque is applied to the vehicle by one of the first switching device and the second switching device during operation of another of the first switching device and the second switching device to vary the voltage.

16. A vehicle system comprising:
a memory having computer readable instructions; and
a processing device for executing the computer readable instructions, the computer readable instructions controlling the processing device to perform a method including:
receiving a request to enter an operating mode of the vehicle, the vehicle including a switching system connected to a battery system and a propulsion system, the battery system including a first battery assembly and a second battery assembly, the propulsion system including a first drive unit and a second drive unit, the switching system including a first switching device configured to selectively connect the first drive unit to the battery system and a second switching device configured to selectively connect the second drive unit to the battery system, the first switching device and the second switching device being independently operable, wherein the first switching device includes a first switch and a second switch connected in parallel to the first drive unit, the second switching device includes a third switch and a fourth switch connected in parallel to the second drive unit, and the switching system includes a battery switching device configured to selectively connect the first battery assembly to the second battery assembly in series; and
based on the request, operating the switching system by a controller to vary a voltage applied to at least one of the first drive unit and the second drive unit during vehicle propulsion, wherein operating the switching system includes controlling the switching system to put the propulsion system into an intermediate voltage state by closing the battery switching device, operating one of the first switching device and the second switching device to supply a low voltage to one of the first drive unit and the second drive unit, and operating another of the first switching device and the second switching device to supply a high voltage to another of the first drive unit and the second drive unit.

17. The vehicle system of claim 16, wherein the first drive unit is configured to drive front wheels of the vehicle, and the second drive unit is configured to drive rear wheels of the vehicle.

18. The vehicle system of claim 16, wherein operating the switching system includes putting the propulsion system into a low voltage state by opening the battery switching device, operating the first switching device to supply a low voltage to the first drive unit, and operating the second switching device to supply the low voltage to the second drive unit.

19. The vehicle system of claim 16, wherein operating the switching system includes putting the propulsion system into a high voltage state by closing the battery switching device, operating the first switching device to supply a high voltage to the first drive unit, and operating the second switching device to supply the high voltage to the second drive unit.

20. The vehicle system of claim 17, wherein the first switching device and the second switching device are configured as single pole double throw switches.

* * * * *